United States Patent
Bangura

(10) Patent No.: US 9,479,019 B2
(45) Date of Patent: Oct. 25, 2016

(54) BRUSHLESS STARTER GENERATOR

(75) Inventor: John F. Bangura, Rockton, IL (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 402 days.

(21) Appl. No.: 13/350,853

(22) Filed: Jan. 16, 2012

(65) Prior Publication Data

US 2013/0181568 A1    Jul. 18, 2013

(51) Int. Cl.
    H02K 3/16    (2006.01)
    H02K 3/20    (2006.01)
    H02K 19/22   (2006.01)
    H02K 19/10   (2006.01)

(52) U.S. Cl.
    CPC ........ *H02K 3/16* (2013.01); *H02K 3/20* (2013.01); *H02K 19/10* (2013.01); *H02K 19/22* (2013.01)

(58) Field of Classification Search
    CPC .......... H02K 3/16; H02K 3/20; H02K 19/10; H02K 19/22
    USPC ............................................. 310/183; 290/46
    IPC ................................................. H02K 3/16, 3/20
    See application file for complete search history.

(56) References Cited

U.S. PATENT DOCUMENTS

| | | | | |
|---|---|---|---|---|
| 980,183 A | | 1/1911 | Bache-Wiig | |
| 2,169,017 A | * | 8/1939 | Baudry | 310/211 |
| 2,280,974 A | * | 4/1942 | Pollard | H02K 3/20 310/183 |
| 2,300,520 A | * | 11/1942 | Pollard | 310/183 |
| 2,691,113 A | * | 10/1954 | Ordas | 310/214 |
| 2,703,849 A | * | 3/1955 | Worth | 310/156.78 |
| 3,793,546 A | * | 2/1974 | King, Jr. | 310/183 |
| 4,506,181 A | * | 3/1985 | Jones et al. | 310/156.78 |
| 4,672,247 A | * | 6/1987 | Madsen | H02K 37/20 310/181 |
| 4,918,343 A | | 4/1990 | Heinrich et al. | |
| 5,177,390 A | * | 1/1993 | Van Maaren | H02K 3/527 310/183 |
| 6,844,707 B1 | * | 1/2005 | Raad | 322/29 |
| 7,078,843 B2 | * | 7/2006 | Du et al. | 310/216.091 |
| 2004/0004523 A1 | * | 1/2004 | Humphries | B03C 1/288 335/296 |
| 2006/0038648 A1 | * | 2/2006 | Humphries | B03C 1/0332 335/306 |
| 2009/0121583 A1 | * | 5/2009 | Smith | 310/269 |
| 2010/0173748 A1 | * | 7/2010 | Teo | A63B 21/00192 482/5 |
| 2013/0181568 A1 | * | 7/2013 | Bangura | 310/183 |
| 2014/0125156 A1 | * | 5/2014 | Meeker | 310/46 |
| 2015/0022198 A1 | * | 1/2015 | David | G01D 5/2013 324/251 |
| 2015/0192234 A1 | * | 7/2015 | Fries | A61M 39/10 285/9.1 |

OTHER PUBLICATIONS

Search Reporting regarding related EP App. No. 13151223.8; dated Jul. 25, 2016; 10 pgs.

* cited by examiner

*Primary Examiner* — John K Kim
(74) *Attorney, Agent, or Firm* — Cantor Colburn LLP

(57) ABSTRACT

A brushless starter generator includes a wound field generator having a rotor that includes a damper winding, wherein the damper winding includes a plurality of poles. Also included is at least one pole face disposed within each of the plurality of poles, wherein the at least one pole face comprises a slot opening. Further included is at least one damper bar relatively entirely filling the slot opening.

5 Claims, 2 Drawing Sheets

BRUSHLESS STARTER GENERATOR

BACKGROUND OF THE INVENTION

The present invention relates to starter generators, and more particularly to brushless wound field starter generators.

For high power, or high power density, brushless wound field starter generator applications, relatively low stator winding inductance is often necessary, in order to meet generate mode transient power quality requirements. The need for the relatively low stator winding inductance typically results in undesirable high peak phase currents during the start mode inverter operation. Accordingly, the overall generator system may be forced to operate at reduced current and power levels that provide insufficient start mode maximum torque.

Efforts to overcome the aforementioned deficiencies have included upsizing the current carrying capability of semiconductor switches in the inverter, adding an external inductor, and using feeder cables with a higher inductance. These approaches often increase overall system weight and may significantly impact the generate mode performance characteristics. Alternatively, increasing the armature leakage inductance may have significant impacts on the steady-state generate mode performance.

BRIEF DESCRIPTION OF THE INVENTION

According to one embodiment, a brushless starter generator includes a wound field generator having a rotor that includes a rotor body that defines a plurality of poles. Also included is at least one pole face disposed within each of the plurality of poles, wherein the at least one pole face comprises a slot opening. Further included is a damper bar supported by at least one laminate, wherein the damper bar relatively entirely fills the slot opening.

According to another embodiment, provided is a method of generating electrical power in a brushless starter generator and includes providing a generator having a rotor body that defines a plurality of poles, each pole having a pole face that includes an opening. Also included is providing an armature within the generator. Further included is filling the opening with a damper bar, wherein the opening is relatively entirely filled with the damper bar.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
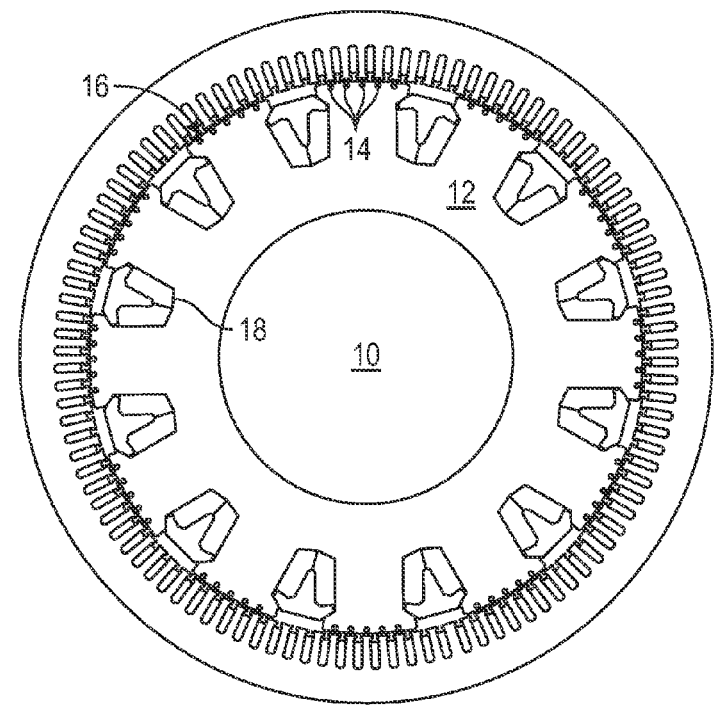
FIG. 1 is a cross-sectional view of a rotor and a stator.
Figure 2:
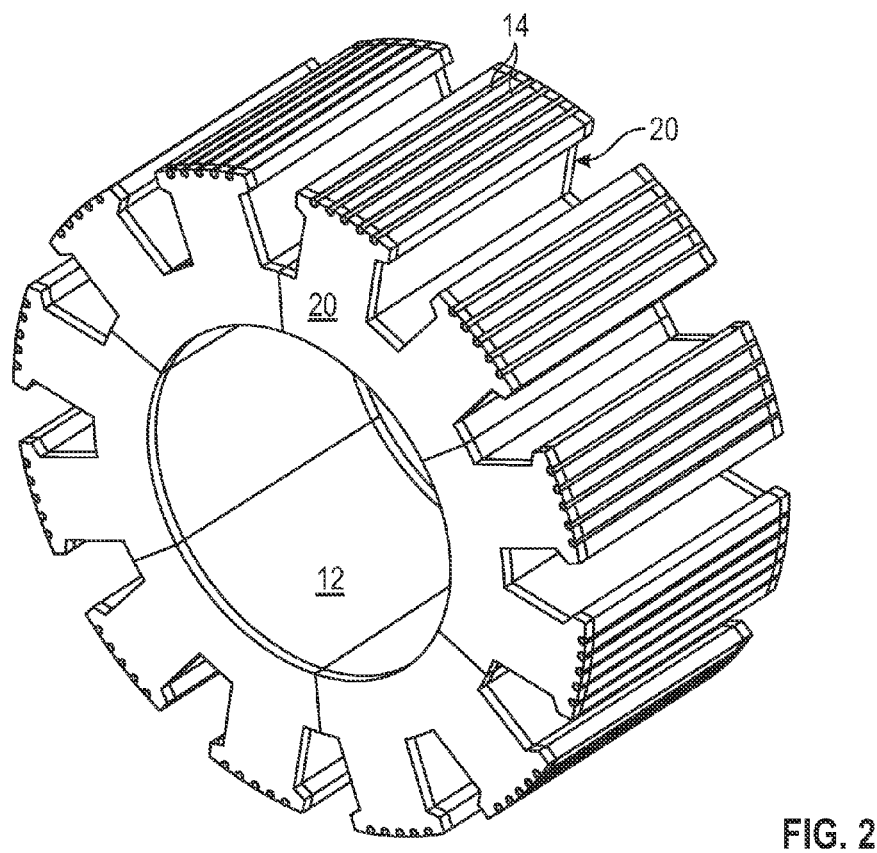
FIG. 2 is a laminated rotor core having a plurality of damper bars disposed within a plurality of slots connected by a pair of end plates.
Figure 3:
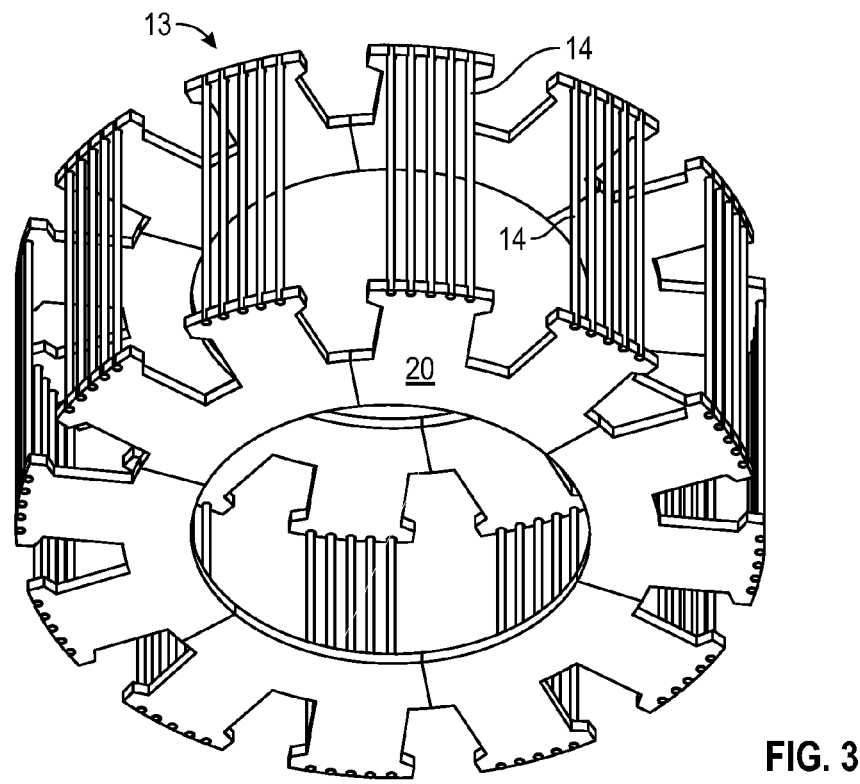
FIG. 3 is an amortisseur circuit comprised of the plurality of damper bars and the pair of end plates.

Referring to FIGS. 1-3, a rotor of a starter generator (not illustrated) is generally referred to as 10. The starter generator is a brushless, wound field synchronous generator that may be operated as a motor in a starting mode to convert electrical power supplied by an external AC power source into motive power or, alternatively, in a generate mode to convert mechanical energy into electrical power. Typically, the starter generator is one assembly of an overall generator assembly, which may include a permanent magnet generator (PMG), an exciter generator for brushless operation and a main generator mounted on a common shaft.

The starter generator comprises a rotor 10 that includes a laminated steel core 12 that supports an "amortisseur" or damper winding 13. A plurality of electrically conductive damper bars 14 are disposed on the laminated steel core 12 and extend axially along the longitudinal direction of the rotor 10 to form a damper winding 13. The damper bars 14 are disposed within a plurality of pole faces 16 that are situated proximate to, and between, a plurality of adjacent rotor slots 18 that house rotor field coils. The damper bars 14 are mechanically and electrically interconnected by electrically conductive end plates, both of which are schematically illustrated as 20. Typically, a first and second end plate is present. The end plates 20 may be formed of any suitable electrically conductive material, with one such suitable material being copper, for example. The damper bars 14 and the electrically conductive end plates 20, in combination, form the damper winding 13, which partially encloses or cages the rotor 10.

The illustrated damper winding 13 is a twelve pole embodiment, which is shown merely for illustrative purposes and it is to be appreciated that numerous other pole embodiments are contemplated.

The damper winding 13 formed by the damper bars 14 and the electrically conductive end plates 20 function to retain the components that typically form the rotor core. Additionally, the damper winding 13 functions to assist the generator during transient and steady-state operations. As a motor in a starting mode, the application of power to the armature windings of the generator causes currents to be induced in the damper bars 14 and the end plates 20. These damper winding currents plus the rotor main field current provided by the exciter rotor windings due to application of power to the stator windings of the exciter generator produce a magnetic field which interacts with a magnetic field established by currents flowing in the armature windings to cause the rotor 10 to rotate relative to a stator and thereby produce power.

Figure 4:
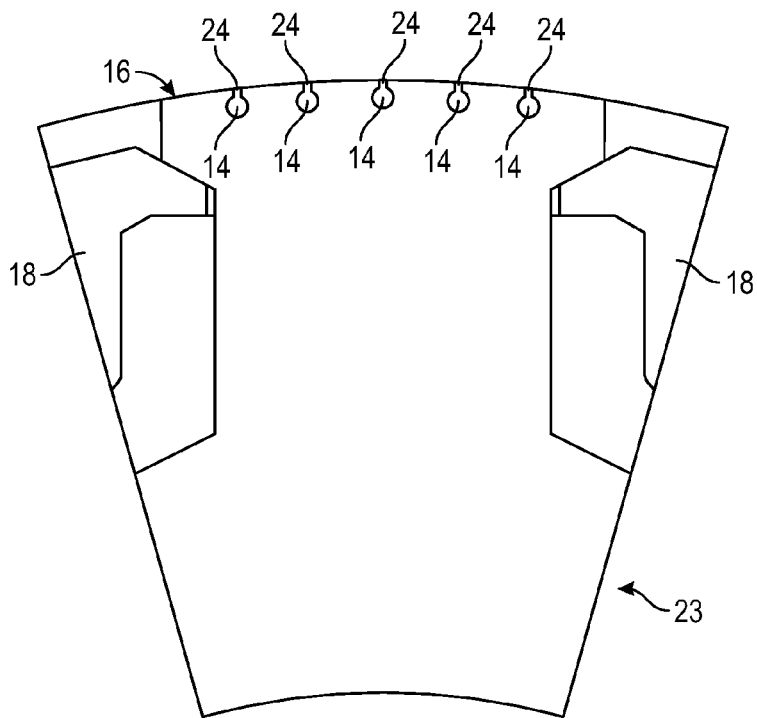
FIG. 4 is an elevational view of a rotor pole segment having a plurality of damper bars disposed within the plurality of slots.

Referring now to FIG. 4, a pole segment 23 is illustrated and is disposed between adjacent rotor slots 18 that provide mechanical support for retaining the rotor field coils and proximate a pole face 16. The pole face 16 includes a plurality of slot openings 24 that are configured to receive the above-described damper bars 14. The damper bars 14 of the exemplary embodiment are formed of a paramagnetic or soft ferromagnetic material. For purposes of this description, a "paramagnetic material" is a material which is slightly magnetically attracted when in the presence of an externally applied magnetic field. Paramagnetic materials have a relative magnetic permeability greater or equal to unity (i.e., a positive magnetic susceptibility) and hence are attracted to magnetic fields. Any suitable paramagnetic material may be employed as the damper bars 14, and specifically any material that contains atoms, ions or molecules with unpaired spins may be considered a paramagnet.

The term "soft ferromagnetic material" for purposes of this description typically refers to materials that are strongly magnetically attracted and have the capacity to strengthen the magnetic field in different parts of a magnetic circuit.

The paramagnetic or soft ferromagnetic damper bars 14 are configured to substantially fill, but preferably completely fill the slot openings 24. By at least substantially filling the slot openings 24 with the paramagnetic or soft ferromagnetic damper bars 14, a closed rotor slot assembly is achieved, which inherently leads to an increase in rotor 10 sub-transient direct-axis inductance. Additionally, based on the lower conductivity of the paramagnetic or soft ferromagnetic material, the damper bar 14 resistances are greater than those associated with copper damper bars having identical cross-sections. Therefore, transient conditions decay more rapidly in an embodiment comprised of paramagnetic and/or soft ferromagnetic damper bars 14.

The damper bars 14 formed of a paramagnetic or soft ferromagnetic material increase the rotor sub-transient direct-axis leakage inductance, as described above, and this has a direct impact on the transient behavior of the overall system, as well as machine winding current peaks and rise rate during periods of inverter switching transients without effecting the steady-state generate mode performance. The relationship between the machine winding current rise rate for a given inverter DC voltage ($V_{DC}$) is related to the direct-axis inductance ($L_D$), and is as follows:

$$di/dt = V_{DC}/[(3/2)*L_D]$$

Therefore, the paramagnetic and/or soft ferromagnetic damper bars 14 reduce or mitigate high peak winding phase currents during start mode with inverter operation of the starter generator.

The starter generator is configured with paramagnetic and/or soft ferromagnetic damper bars 14 which substantially or completely fill the slot openings 24, thereby providing a closed rotor assembly and increasing power capability, as well as power density of wound field starter generators, based on the advantages described above that are associated with the closed rotor assembly.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A brushless starter generator comprising:
   a rotor that includes a rotor body that defines a plurality of poles, wherein each of the plurality of poles includes at least one pole face to define a plurality of pole faces;
   a plurality of slot openings defined by each of the plurality of pole faces; and
   a plurality of damper bars supported by a respective laminate, wherein each of the damper bars completely fills a respective slot opening, the damper bars comprised of a soft ferromagnetic material.

2. The brushless starter generator of claim 1, wherein the plurality of damper bars each comprise a first end and a second end.

3. The brushless starter generator of claim 2, wherein the plurality of damper bars are operably coupled to a first end plate at the first end and a second end plate at the second end.

4. The brushless starter generator of claim 3, wherein the first end plate and the second end plate are comprised of copper.

5. A brushless starter generator comprising:
   a rotor that includes a rotor body that defines a plurality of poles, wherein each of the plurality of poles includes at least one pole face to define a plurality of pole faces;
   a plurality of slot openings defined by each of the plurality of pole faces, each of the slot openings having a first portion and a second portion; and
   a plurality of damper bars supported by a respective laminate, wherein each of the damper bars completely fills the second portion of a respective slot opening, the damper bars comprised of a soft ferromagnetic material.

* * * * *